United States Patent [19]

Boele

[11] Patent Number: 4,609,156
[45] Date of Patent: Sep. 2, 1986

[54] APPLIANCE FOR MINCING FOODSTUFFS

[75] Inventor: Floris Boele, Hoogeveen, Netherlands

[73] Assignee: U.S. Philips Corporation, New York, N.Y.

[21] Appl. No.: 678,301

[22] Filed: Dec. 5, 1984

[30] Foreign Application Priority Data

Dec. 8, 1983 [NL] Netherlands ..................... 8304235

[51] Int. Cl.⁴ ............................................. B02C 18/12
[52] U.S. Cl. ............................. 241/199.12; 241/282.2; 366/331
[58] Field of Search .................... 241/37.5, 92, 199.12, 241/282.1, 282.2; 366/331, 349

[56] References Cited

FOREIGN PATENT DOCUMENTS 2845689  4/1980  Fed. Rep. of Germany ..... 241/37.5
2850725  6/1980  Fed. Rep. of Germany .

Primary Examiner—Howard N. Goldberg
Assistant Examiner—Timothy V. Eley
Attorney, Agent, or Firm—Rolf E. Schneider

[57] ABSTRACT

Apparatus for mixing foodstuffs comprises a bowl having a hole in its bottom, a removable cover for closing the bowl, and a rotary cutter positioned in the lower portion of the bowl and having a central bore. A coupling shaft extends through the central bore of the rotary cutter and the hole in the bowl bottom to effect rotation of the rotary cutter when the removable cover is placed on the bowl, the upper end of the coupling shaft being journalled on the under side of the removable cover and the lower end of the coupling shaft being detachably coupled to a drive means. Resilient means is associated with the rotary cutter and cooperates with the bowl for connecting the rotary cutter to the bowl in the axial direction of the coupling shaft.

3 Claims, 3 Drawing Figures

APPLIANCE FOR MINCING FOODSTUFFS

BACKGROUND OF THE INVENTION

This invention relates to an appliance for mincing foodstuffs, comprising a bowl and a removable cover for closing the bowl, the bowl containing a rotary cutter and having a hole in its bottom through which drive can be transmitted to the rotary cutter, the cover carrying a coupling member for coupling the rotary cutter to a drive means when the cover is fitted on the bowl.

Such an appliance is disclosed in German Offenlegungsschrift No. 2850725. The known appliance comprises a loose rotary cutter which lies on the bottom of the bowl and which comprises a cylindrical portion and a number of cutter blades. During use the appliance is placed on a kitchen machine, the rotary cutter and the drive means being coupled to each other when the cover is placed on the bowl. When the cover is removed the rotary cutter and the drive means are uncoupled, so that the rotary cutter cannot be driven after the cover has been removed. This provides some protection against the user touching the rotating cutter.

The known appliance has the drawback that when the cover is removed from the bowl, especially if this is done abruptly, the rotary cutter may be lifted off the bottom of the bowl with the cover and may subsequently drop off. The rotary cutter may even still be rotating when it is lifted off the bottom of the bowl. In either case the rotary cutter may injure the user. Furthermore, even if the rotary cutter is not lifted when the cover is removed, it may readily tilt over inside the bowl, possibly into the foodstuffs in the bowl. Since the rotary cutter generally comprises sharp blades, the risk of injuries occurring during removal of a rotary cutter which lies obliquely in the bowl increases in comparison with the removal of a rotary cutter which is in its normal upright position.

SUMMARY OF THE INVENTION

It is an object of the present invention to provide an appliance in which these risks are obviated or very greatly reduced. According to the invention there is provided an appliance for mincing foodstuffs comprising a bowl and a removable cover for closing the bowl, the bowl containing a rotary cutter preferably positioned in the lower portion thereof and having a hole in its bottom through which drive can be transmitted to the rotary cutter, the cover carrying a coupling member for coupling the rotary cutter to a drive means when the cover is fitted on the bowl, the rotary cutter being provided with resilient connecting means cooperable with the bowl to connect the rotary cutter to the bowl in the axial direction of the rotary cutter.

The appliance in accordance with the present invention has the advantage that due to the connection between the rotary cutter and the bottom of the bowl, when the cover is removed from the bowl, the rotary cutter remains attached to the bowl. Preferably, the resilient connecting means is so constructed and dimensioned as to provide the necessary connection between the rotary cutter and the bowl while allowing the rotary cutter to be readily fitted and removed by the user.

The appliance may be used for mincing foodstuffs of various kinds such as meat, vegetables and fruit.

The rotary cutter may comprise a central hub to which one or more cutter blades and the resilient connecting means are secured. The hub and the connecting means are preferably made of a plastic, such as a glass-fibre-reinforced polyamide or an acrylic butadiene styrene, and they may be integral with each other. The cutter blades are generally made of a metal, such as a stainless steel.

In a preferred embodiment of the invention the resilient connecting means comprises at least two projections which are elastically deflectable in directions transverse to the axis of the rotary cutter and which are engageable behind a rim on the bottom of the bowl. This embodiment has the advantage that the resilient connecting means can be dimensioned easily and can be manufactured inexpensively. When the rotary cutter has a plastic hub, this hub and the projections are preferably injection-moulded as a one-piece product.

The resilient connecting means may extend through the hole or bore in the bottom of the bowl. In this embodiment, when the rotary cutter is fitted in the bowl the resilient connecting means lies between the periphery of the hole in the bottom of the bowl and a shaft or the like which extends through the hole to transmit drive to the rotary cutter. The connecting means cooperates resiliently with a rim surrounding the hole. This embodiment is particularly simple.

BRIEF DESCRIPTION OF THE DRAWING

This invention will now be described in more detail with reference to the accompanying drawings, in which.

DESCRIPTION OF THE PREFERRED EMBODIMENT

Figure 1:
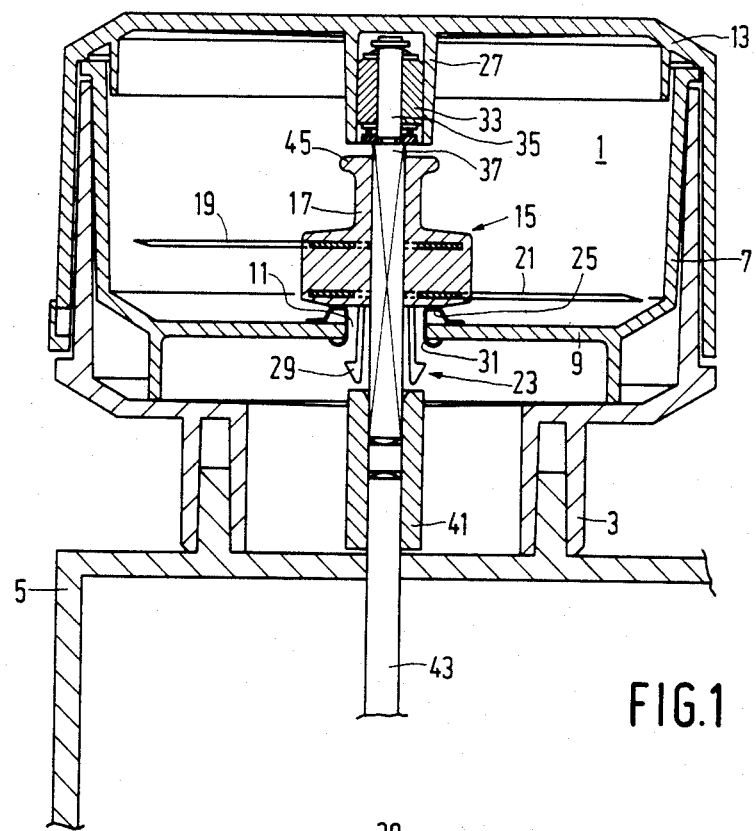
FIG. 1 is an axial sectional view of an appliance or apparatus constructed in accordance with the invention.

The appliance 1 in FIG. 1 is shown in the operating condition, fitted on an adapter 3 which in turn is fitted on a kitchen machine 5, shown schematically. The appliance 1 comprises a bowl 7 for holding the foodstuffs to be minced, which bowl is almost wholly enclosed, except at the top, by the adapter 3. In the bottom 9 of the bowl 7 a central hole or bore 11 is formed. The bowl 7 is closed at the top by a removable transparent cover 13.

Figure 2:
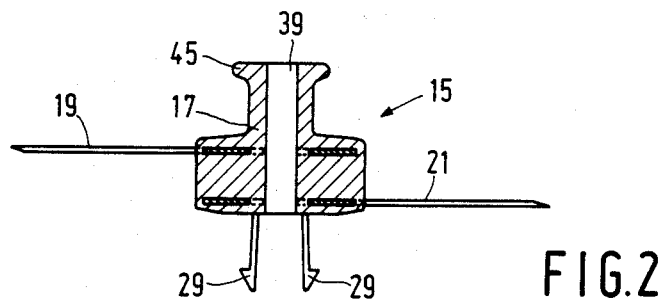
FIG. 2 is an axial sectional view of the rotary cutter of the appliance shown in FIG. 1.
Figure 3:
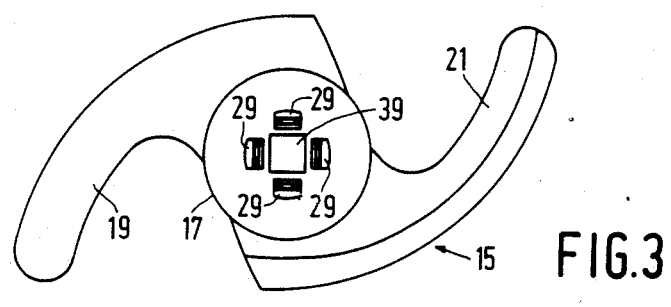
FIG. 3 is an underneath view of the rotary cutter shown in FIG. 2.

Inside the bowl 7 is a rotary cutter 15 which comprises a central hub 17, two cutter blades 19 and 21 and resilient connecting means 23 for connecting the rotary cutter loosely to the bottom 9 of the bowl 7. The hub 17 bears on the upper rim of a bearing ring 25 which is located in the hole 11 and which is secured to the bottom 9 of the bowl 7. In the present embodiment the resilient connecting means 23 comprises four projections in the form of resilient hooked fingers 29 (see also FIGS. 2 and 3), which project in substantially axial directions from the lower side of the hub 17 and which are evenly distributed about the axis of the hub. It will be appreciated that the number of fingers may differ from four. The fingers 29 are deflectable in directions transverse to the axis of the hub 17. They extend through the bearing ring 25 with clearance and are engageable beneath the lower rim 31 of the bearing ring 25 with their hooked distal ends. The central hub 17 and the fingers 29 are injection-moulded as an integral piece from a glass-fibre-reinforced polyamide. The cutter blades 19 and 21, which are made of a CrNi steel, are embedded in the hub 17.

The side of the cover 13 which faces rotary cutter 15 carries a bush 27 in which a bearing 33 is fixed. A portion 35 of a coupling shaft 37 is journalled in the bearing 33. The coupling shaft 37 includes a further portion which projects from the bearing 33 and which has a rectangular cross-section. This latter portion extends slidably through a central-bore 39 (see FIGS. 2 and 3) in the hub 17 and through the bearing ring 25 in the bottom of the bowl 7. The latter shaft portion further extends into a coupling sleeve 41 of a drive means 43 which forms part of the kitchen machine 5 and of which only a shaft portion is shown. The cross-section of central bore 39 in the hub 17 and that of the coupling sleeve 41 of the drive means 43 correspond to the cross-section of the coupling shaft 37, so that in the situation shown in FIG. 1 the rotary cutter 15 is detachably coupled to the drive means 43 so that it can be rotated thereby. The coupling shaft 37 then functions as a drive shaft.

When the cover 13 is removed from the bowl 7 the coupling shaft 37 moves with the cover and slides first out of the coupling sleeve 41 to uncouple the rotary cutter 15 from the drive means 43, and then out of the central bore 39 of the hub 17. As the coupling shaft 37 is drawn through the bore 39 it may tend to lift the rotary cutter 15 off the bottom 9 of the bowl 7 but the hooked fingers 29 will engage beneath the lower rim 31 of the bearing ring 25 and will be retained thereby to prevent the rotary cutter 15 from becoming detached from the bowl 7. Thus, the cover 13 can be removed from the bowl 7 without any risk to the user. The rotary cutter 15 can be removed by holding the upper rim 45 of the hub 17, which rim is not sharp, and pulling the rotary cutter upwards to withdraw the fingers 29 from the bearing ring 25, which requires only a minimal effort.

When the appliance 1 is to be put into operation, first the rotary cutter 15 is fitted in the bowl 7 by inserting the fingers 29 through the bearing ring 25 in the bottom 9 of the bowl 7. Subsequently, the foodstuffs to be minced are put into the bowl 7, after which the cover 13 is fitted on the bowl, the coupling shaft 37, which is secured to the cover 13 at the same time being inserted through the central bore 39 of the hub 17 into the coupling sleeve 41 thereby establishing a coupling between the drive means and the rotary cutter 15.

The invention is not limited to the embodiment described above. For example, the cover may have a filling opening.

What is claimed is:

1. Apparatus for mincing foodstuffs, which comprises a bowl having a hole in its bottom; a removable cover for closing the bowl; a rotary cutter positioned in the lower portion of said bowl and having a central bore; a coupling shaft extending through the central bore of the rotary cutter and the hole in the bowl bottom to effect rotation of the rotary cutter when the removable cover is placed on the bowl, the upper end of said coupling shaft being journalled on the under side of the removable cover and the lower end of said coupling shaft being detachably coupled to a drive means; and resilient means associated with the rotary cutter and cooperable with the bowl for connecting the rotary cutter to the bowl in the axial direction of the coupling shaft.

2. Apparatus according to claim 1, in which the resilient connecting means extends through the hole in the bowl bottom.

3. Apparatus according to claim 2, in which the resilient connecting means comprises at least two projections elastically deflectable in directions transverse to the axis of the coupling shaft and engageable behind a rim on the bottom of the bowl.

* * * * *